United States Patent
Feigenbaum

(10) Patent No.: US 6,763,089 B2
(45) Date of Patent: Jul. 13, 2004

(54) SYSTEM FOR ENABLING TDD COMMUNICATION IN A TELEPHONE NETWORK AND METHOD FOR USING SAME

(75) Inventor: Shelli D. Feigenbaum, Commack, NY (US)

(73) Assignee: Nortel Networks Limited, St. Laurent (CA)

( * ) Notice: Subject to any disclaimer, the term of this patent is extended or adjusted under 35 U.S.C. 154(b) by 71 days.

(21) Appl. No.: 09/976,721

(22) Filed: Oct. 12, 2001

(65) Prior Publication Data

US 2003/0072420 A1 Apr. 17, 2003

(51) Int. Cl.[7] .............................................. H04M 11/00
(52) U.S. Cl. ...................... 379/52; 379/88.04; 704/271
(58) Field of Search ................................ 379/52, 93.17, 379/88.12, 88.14, 93.18, 93.24, 93.26, 93.28, 88.04; 704/271

(56) References Cited

U.S. PATENT DOCUMENTS

| | | | |
|---|---|---|---|
| 5,163,081 A | * 11/1992 | Wycherley et al. | ............ 379/52 |
| 5,774,857 A | * 6/1998 | Newlin | ........................ 704/271 |
| 5,991,723 A | * 11/1999 | Duffin | .......................... 704/260 |
| 6,002,749 A | 12/1999 | Hansen et al. | |
| 6,078,650 A | 6/2000 | Hansen | |
| 6,389,114 B1 | * 5/2002 | Dowens et al. | ................ 379/52 |
| 6,546,082 B1 | * 4/2003 | Alcendor et al. | ............. 379/52 |

* cited by examiner

Primary Examiner—Wing Chan
(74) Attorney, Agent, or Firm—Kevin L. Smith

(57) ABSTRACT

A system and method for enabling telephone network subscribers using a telecommunications device for the deaf (TDD) to communicate with other network subscribers lacking such a device. The TDD user dials a number that connects them with an automatic relay switch (ARS). The ARS determines the intended recipient of the call and establishes a connection to them. The TDD user then transmits a message in TDD format to the ARS, which converts it into an ASCII text file that is in turn provided to a text-to-speech (TTS) engine that synthesizes a voice message from the text file. The voice message is then sent to the non-TDD-enabled subscriber. The ARS then preferably prompts the non-TDD-enabled subscriber to enter a response. The response may be made by voice communication or by using the telephone keypad to send dual-tone multi-frequency tones back to the ARS according to instructions that were provided to the called party for this purpose. The instructions may take the form of a menu of options that is either standard or customized according to instructions previously received from the TDD user. The ARS process the response, converting it to a TDD format and transmitting it back to the TDD user.

17 Claims, 4 Drawing Sheets

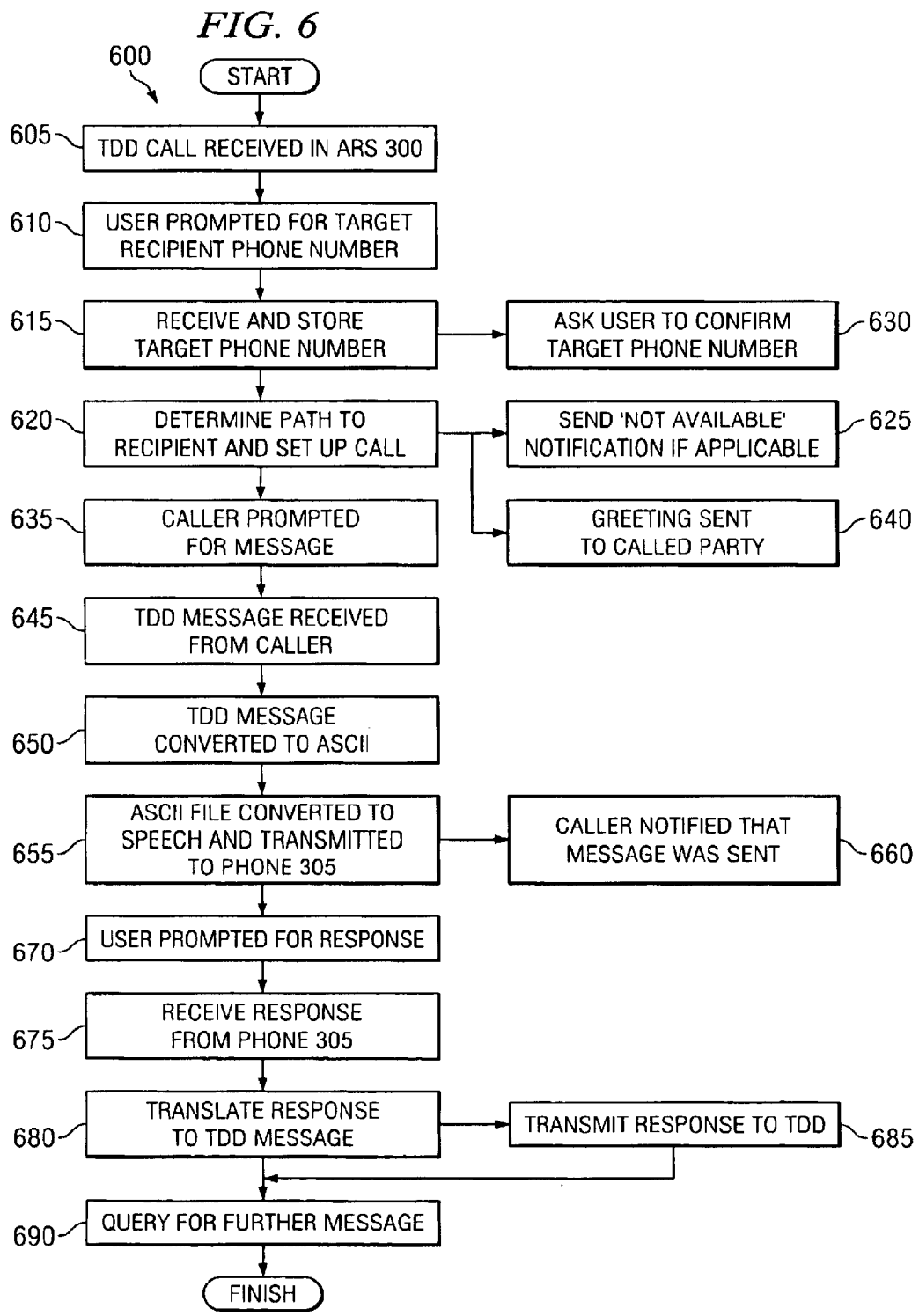

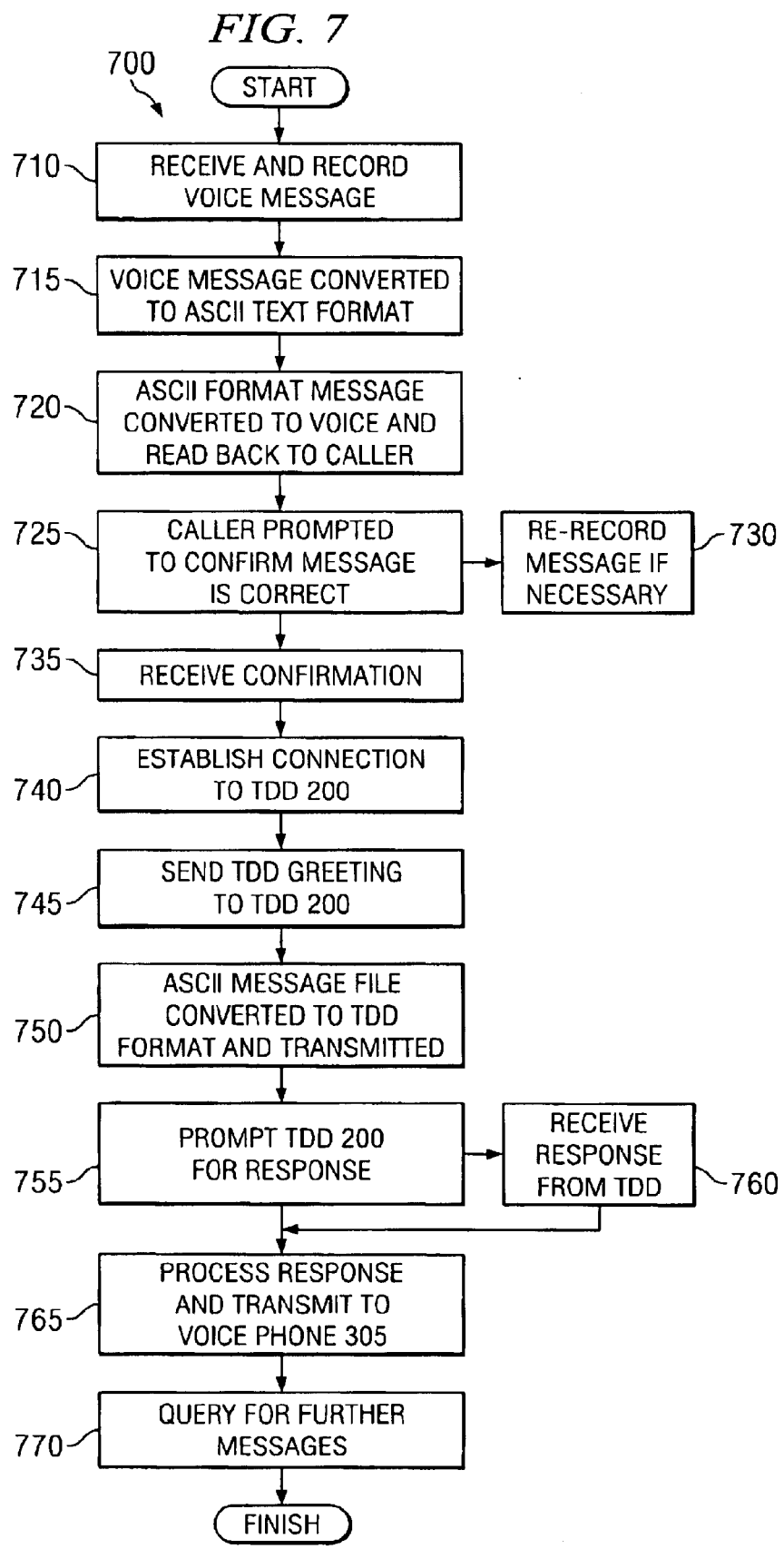

SYSTEM FOR ENABLING TDD COMMUNICATION IN A TELEPHONE NETWORK AND METHOD FOR USING SAME

BACKGROUND OF THE INVENTION

TECHNICAL FIELD OF THE INVENTION

This invention relates to telecommunications systems for the hearing impaired, and more specifically to a system and method for enabling communications through a public telecommunications network between a party using a TDD device and a party not so equipped.

There are various networks, public and private, that may be used for telephone communication. The public system we are all familiar with is often referred to as the public switched telephone network (PSTN). FIG. 1 (prior art) is a simplified block diagram illustrating the basic configuration of an exemplary PSTN 100. In general terms, PSTN 100 typically comprises numerous local exchanges, which may also be referred to as central offices (COs). Each CO is connected to dozens or even hundreds of telephone service subscribers, although for simplicity only two are shown in FIG. 1, designated as party 1 and party 2. (The terms "user" and "subscriber" will be used interchangeably herein.) COs may be connected to each other either directly or though other telephone offices in order to properly route telephone calls. Two or more COs may be connected by a tandem office (TO), which may be viewed as the next higher level in a hierarchical network structure. A primary toll center may connect the various COs and tandems of a particular telephone company and themselves be connected to primary toll centers operated by others (not shown). The primary toll centers (PTC) of a given region may be connected to a sectional toll center (STC), a number of which may be connected with a regional toll center (not shown). Note that the illustrated PSTN 100 hierarchy is exemplary and is not employed in all systems. Where it exists, however, calls are usually routed through the lowest common switching level, with higher level offices used only for calls that are to terminate outside of the network below them. Party 1 and party 2 are typically but not necessarily located at a home or business site. In this illustration, party 1 may be the calling party and party 2 the called party. The call between them may be connected from their respective COs through a tandem office. Note the majority of telephone calls are two-party calls. The calling party initiates the process by opening up a dedicated circuit that will be used until the call is completed. This is true even where one or both of the parties are not human, such as when one fax machine 'calls' another. In some cases, more than two parties may be present on a call, and such a call may be in that event initiated by a phone-company operator. Note that the system and method of the present invention is equally applicable to these multiple-party telephone calls as well, but such applications will not be discussed separately herein.

Party 1 initiates the call by 'going off hook', which in many cases is accomplished simply by raising the handset from it's hook, but may also be accomplished in other way such as depressing a calling button on the telephone, annunciating a voice command, or similar steps. Going off hook completes a circuit between party 1's telephone set and the CO, which is then ready to receive instructions on how to set up the remainder of the call circuit.

These instructions are given by the caller 'dialing' the telephone number of the called party. On a rotary telephone, this is actually accomplished by turning a spring-loaded dial and letting it return to its original position. Other phones are capable of instead producing a distinctive tone, or more specifically a pair of tones corresponding to each of its numbered keys. The pair of tones is sometimes referred to as a dual tone multi-frequency (DTMF) signal, and is recognizable by the PSTN. A caller using one of these touch-tone phones simply depresses the keys corresponding to a telephone number in order to place a call.

When the CO receives dialing instructions, it proceeds to set up the call. It determines the location of the called party in terms of the path that a connection to them must take. If party 2 is connected to the same local office as party 1, the connection may simply be established through the local office and goes no higher in the network hierarchy. If not, the next highest level of the network is used, and then the next highest, and so on, on until the call can be placed. The connection is maintained until the parties go on hook when the call is completed. The various network lines used for the call are then freed for other uses.

Very useful for voice communication, as it is used by most of the population, PSTN 100 is obviously of little use for those who are without the ability to hear or speak or, as is sometimes the case, without either ability. For them the wonders of instant conversation go unrealized without some additional facility. Although modern telephone networks are now capable of transmitting data as well as voice, practical limitations often still prevent conversation-like communications. For example, telephones are ubiquitous while fax machines and computers are not as readily available. To send a fax message, the intended recipient must also have a fax machine, and of course one that is turned on and already connected to a phone line. While it is not uncommon for businesses to have such situation, the fax machine frequently remains unattended, with fax messages picked up only on an occasional basis. Even where an attendant continually monitors the machine, the intended recipient is likely someone else and must await delivery. And a fax message cannot be returned until it is received by the intended recipient. Fax machines in residences are often even less helpfully situated, many of them remaining unconnected until a through a voice conversation the sender and the recipient coordinate having it hooked up to a free line so that the fax message can be sent at an agreed upon time. For these reasons, fax machines are usually not a suitable substitute for a voice conversation.

Personal computers, while increasingly common in both home and office, have similar limitations in providing conversation-quality communications. Sending electronic mail (email) messages is a form of communicating with many advantages, but actual conversation is only achieved under certain circumstances. Note that as used herein, the terms 'conversation' and 'conversation quality' connote the ability for two (or more) parties to engage in a series of communications in a single communication session in which all parties participate substantially simultaneously. In the context of voice communication this is naturally possible, though it can also be achieved (albeit with some awkwardness) by repeated faxes or emails sent back and forth between parties in attendance at the proper devices at the same time. Computers connected to a communication network also offer the ability to 'chat', where two or more parties type in text messages that are with no significant delay displayed on the monitors of intended recipients. Again, however, absent a coincidence of users availing themselves of the same facility at the same time, chat sessions must be by advance arrangement.

Fortunately, however, a device has been developed to permit conversation between persons who are hearing (or speech) impaired. Often referred to as a telephone device for the deaf (TDD), it may be connected to a standard phone line. A TDD is a basically a telephone instrument that sends and receives text instead of voice communications. (TDDs are sometimes referred to as TTYs after the 'teletypewriters' on which they were originally modeled.) An exemplary TDD is illustrated in FIG. 2 (prior art). There, TDD 200 features a keyboard 210 used by callers to enter text for transmission. A visual display 220 may be used to read the text that is being entered and, of course to read responsive text messages as they are received. The display—may be larger than that illustrated in FIG. 2, but its size is limited by the desired level of portability for the instrument. Acoustic cups 230 and 235 may be provided to receive the microphone and speaker on the handset of a standard telephone (not shown). Other TDDs may simply use a jack-type connection, such as a TDD that is designed for use with a cell phone (also not shown).

Text that is entered into the TDD via keyboard 210 is converted into tones (or, where applicable, representative electrical signals), often according to a standard known as Baudot, a universally recognized encoding scheme. The tones are, as might be expected, transmittable over ordinary phone lines. When received by the called party, the tones are converted back to text for display on the recipient's TDD. Depending on the key-entry speed of each user, the text messages can be in this way exchanged in relatively rapid succession to provide conversation-quality communication, even for those whose speech or hearing are impaired.

In normal use, TDDs can easily be used in conjunction with telephone devices that have a visible or vibrating alarm in addition to (or instead of) an audible one. This simple modification allows the call initiation process to proceed in the usual fashion as well, that is, the caller simply dials the telephone number of the called party and waits for them to answer. The call recipient, upon noticing the incoming call, simply goes off-hook and makes any necessary TDD setup connections (such as placing the handset into acoustic cups 230 and 235) so that the TDD conversation can begin. In other words, TDDs enable two (or more) properly equipped parties to place and receive calls and engage in regular (albeit textual) telephone communication without the need for a properly connected and configured fax machine or computer.

Unfortunately a limitation exists where a person needing a TDD for telephone communication calls a person who does not (need or) have one. As the non-TDD-enabled party is restricted to voice communication no conversation will ordinarily be possible. Of course, persons who expect regularly to be contacted by TDD users may arm themselves with such a device and resort to it when an encoded call is detected. This is not the norm, however, and the cost of equipping every potential TDD call recipient would be enormous. For example, TDD users may wish to call hospitals, doctor's offices, and fire or police stations. Although a 911 service located in a major city might be expected to be equipped for TDD calls, not all emergency calls are so placed. Nor are all calls to such entities necessarily of an emergency nature, and are therefore not appropriately made to 911 or the hospital emergency room. A patient may simply wish to know if a certain medication is currently available, for example. TDD users may also wish to contact people they normally converse with, but while they are at a location not equipped for TDD communication.

One solution to the problem of a TDD user attempting communication with another party not so equipped is to provide what is often referred to as a telecommunications relay service (TRS). A TDD user wishing to call a subscriber that does not (or may not) have a TDD begins by contacting a TRS. At he TRS, human operators are provided with TDD devices and when called by a TDD user establish a conversation using the TDD facility. Then the caller lets the operator know whom they are calling, and the operator establishes a separate connection to them. The operator then communicates with the caller using their TDD and with the called party using regular voice communication. Messages given by one party are appropriately translated and provided to the other in a format that they can understand. Although a large improvement over having no message relay system at all, TRS does have its drawbacks. First, operators may be otherwise occupied when a call is places, and waiting for one to become available may result in significant delay. In an emergency, of course, this delay could have disastrous consequences. Although a protocol could be established for signaling an emergency situation and reprioritizing TDD calls to a TRS appropriately, this is a solution that is not, however, always available. And of course this remedy would presumably not be available outside of a real emergency, and as a result regular calls that nevertheless require expedience may go unmade. For instance, a TDD user may wish to get a message to a spouse regarding the cancellation of an appointment, but know that the spouse is soon leaving to go to keep it. While not a true emergency, time is still of the essence. Secondly, the operator is, after all, human and capable of translation errors. These errors may take several message exchanges to correct simply because each message must again be translated by the human operator. Finally, the TDD user or their correspondent may be uneasy discussing personal matters with a human operator even if it can be assumed they are generally discreet.

Needed is a way for those whose telephone usage is limited by the need for a TDD to be able to call and effectively communicate with any other telephone service subscribers, regardless of whether the other subscribers are themselves using a TDD. The system and method of the present invention provide just such a solution.

SUMMARY OF THE INVENTION

To overcome the above-described deficiencies in the prior art, the present invention provides a system and method for enabling unassisted communication between a TDD user and a non-TDD user through a standard telephone network. In one aspect, the invention is an automated relay system (ARS) for use in a telecommunications switching office, the system including a controller, a TDD receiver for receiving TDD communications from a calling party over a first communication line, a translator for converting the TDD communications into a standard telecommunications protocol, and a text-to-speech (TTS) engine for receiving the standard telecommunications signal from the translator and transforming it to recognizable speech for transmission to a called party over a second communication line established by the ARS. The ARS may further include a TDD signal generator for generating TDD signals for transmission to the calling party over the first communications line. The TDD signals to the calling party may represent instructions formulated by the ARS based on predetermined criteria. The invention may further include a dual-tone multi-frequency (DTMF) decoder for receiving DTMF signals from one of the parties and translating them into instructions for the ARS. A database in communication with the ARS may to used to store pre-recorded instructional messages, in either speech or TDD format, for transmission to one of the parties at the direction of the ARS controller. In another aspect, the present invention is a method of relaying communications between a calling party using a TDD and a called party having a conventional telephone. The method includes the steps of providing an ARS comprising a controller, a TDD receiver, a translator, and a TTS converter, receiving TDD format communications from the calling party, translating them into a standard telecommunications protocol, converting them into speech, and establishing a communication link for transmitting the speech message to the called party. The method may further include selecting a pre-recorded instructional message, transmitting it to at least one of the parties, receiving a DTMF response, and decoding the DTMF response into instructions for the ARS.

BRIEF DESCRIPTION OF THE DRAWINGS

FIG. 6 is a flow diagram illustrating a method, in detail, of processing a TDD communication according to an embodiment of the present invention; and FIG. 7 is a flow diagram illustrating a method, in detail, of processing a voice communication according to an embodiment of the present invention.

DETAILED DESCRIPTION OF A PREFERRED EMBODIMENT

FIGS. 1 through 7, discussed herein, and the various embodiments used to describe the principles of the present invention in this patent document are by way of illustration only and should not be construed in any way to limit the scope of the invention.

Figure 1:
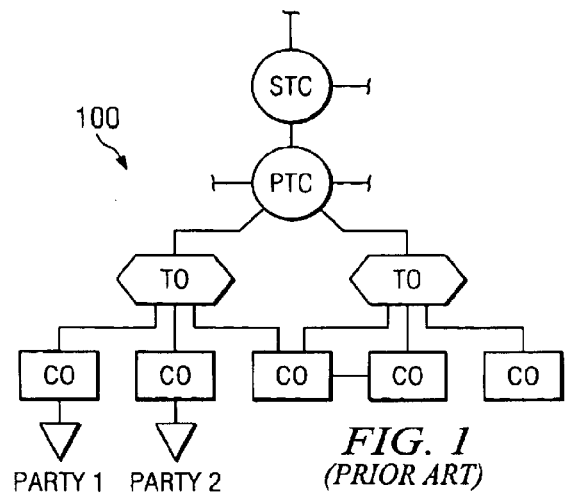
FIG. 1 (prior art) is a functional block diagram illustrating an existing telephone network, such as one that might beneficially adopt the system and method of the present invention.
Figure 2:
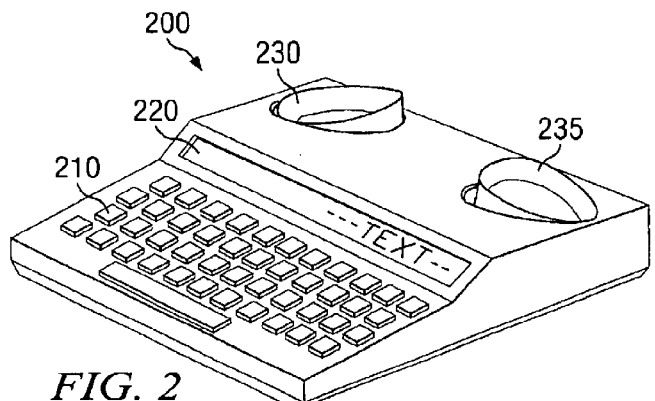
FIG. 2 (prior art) is an illustration of a TDD, such as one that might be used in accordance with practicing the system and method of the present invention.
Figure 3:
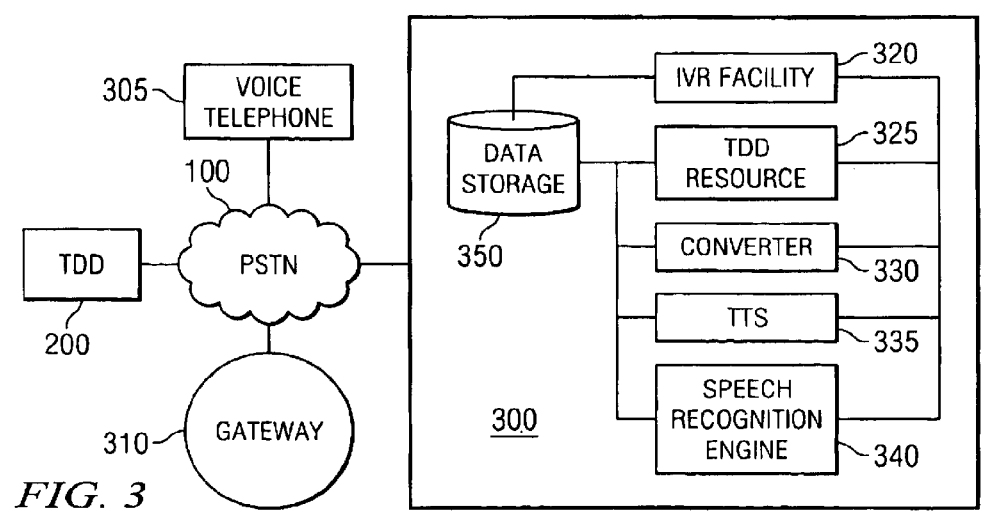
FIG. 3 is a block diagram illustrating selected components of an automatic relay system (ARS) according to an embodiment of the present invention.

FIG. 3 is a block diagram illustrating selected components of an automatic relay system (ARS) 300 according to an embodiment of the present invention. ARS 300 is connected to a telephone network such as PSTN 100 (shown in FIG. 1). Although ARS 300 may be used in connection with other communications networks as well, it is most advantageously employed in a PSTN 100. For illustration, two communications instruments are shown connected to PSTN 100, TDD 200 and voice telephone 305, though in reality of course there may be thousands of such instruments in or connectable to the network. Gateway 310 connects PSTN 100 with other networks, such as a wireless cellular network (not shown). ARS 300, which may for example be located in a central office (CO) of PSTN 100, includes an interactive call response (IVR) facility 320. An IVR facility 320, such as the VPS/is available from Nortel Networks, is a computing device that allows a caller to access information, for example information stored on a remote database, using an ordinary touch-tone telephone. A touch-tone phone is one that produces a standard dual-tone multi-frequency (DTMF) audio signal whenever any one of the keys on its keypad is pressed. The DTMF signals are recognized by the IVR facility 320. Modern IVR platforms such as the one referred to above are also capable of recognizing TDD formatted (that is, Baudot) input. IVR facility 320 preferably includes a processor and a control program for directing communication with telephone service subscribers and supervising the operation of ARS 300.

Also included in ARS 300 is TDD resource 325, converter 330, text-to-speech engine (TTS) 335, speech recognition engine 340, and data storage device 350. TDD resource 325, while not an actual TDD such as the one illustrated in FIG. 2, contains the programmed circuitry necessary to receive and provide TDD input for use by IVR facility 320 and converter 330. Converter 330 received the TDD input and translates into an ACSII text file, which is preferably stored on data storage device 350 until needed. TTS is a speech-generation facility that generates recognizable speech patterns based on the ASCII files for transmission to voice telephone 305. In this way telephone 305 is provided with a reasonable representation of the message transmitted by TDD 200, but which it could not have interpreted if received directly.

Speech recognition engine 340, on the other hand, receives audio speech input from instruments such as phone 305 and converts them to a text file, preferably in ASCII format. Any text files so created my also be stored on data storage device 350. The stored files may then be converted to a TDD format in converter 330 (or alternately a in a separate converter) for transmission to TDD 200. Data storage device 350 houses not only the text files referred to above, but preferably also contains a library of prerecorded messages in both voice and TDD format for sending as applicable to phone 305 and TDD 200, respectively. Prerecorded messages are for greater accuracy used whenever possible, such as when providing instructions or as a template combined with generated messages. Note that although represented as a single storage facility, data storage device 350 may actually be a number of such devices, some or all of which are preferably, though not necessarily, physically co-located with ARS 300.

Figure 4:
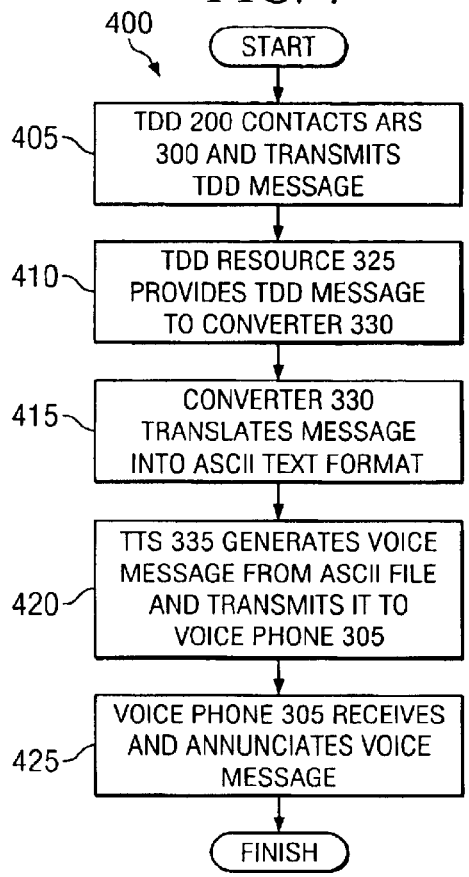
FIG. 4 is a flow diagram illustrating a method of processing a TDD communication according to an embodiment of the present invention.

FIG. 4 is a flow chart illustrating a method 400 of processing a TDD communication, at an overview level, according to an embodiment of the present invention. Initially (START), an ARS such as the ARS 300 described above in reference to FIG. 3 has been provided. A TDD user contacts ARS 300 though an instrument such as TDD 200 and transmits a message in TDD format (step 405). Note that TDD 200 may have dialed a known telephone number in order to reach ARS 300 or may have been transferred there automatically by a switch recognizing it as a TDD. ARS 300 receives the TDD message in TDD resource 325 and provides it to converter 330 (step 410). Converter 330 converts the message from TDD format to ASCII format and provides the ASCII file to TTS 335 (step 415). TTS 335 used the ASCII file to generate an audible speech signal and transmits it to voice phone 305 (step 420). Voice phone receives the speech signal from ARS 300 and annunciates it as with any other voice communication (step 425).

Figure 5:
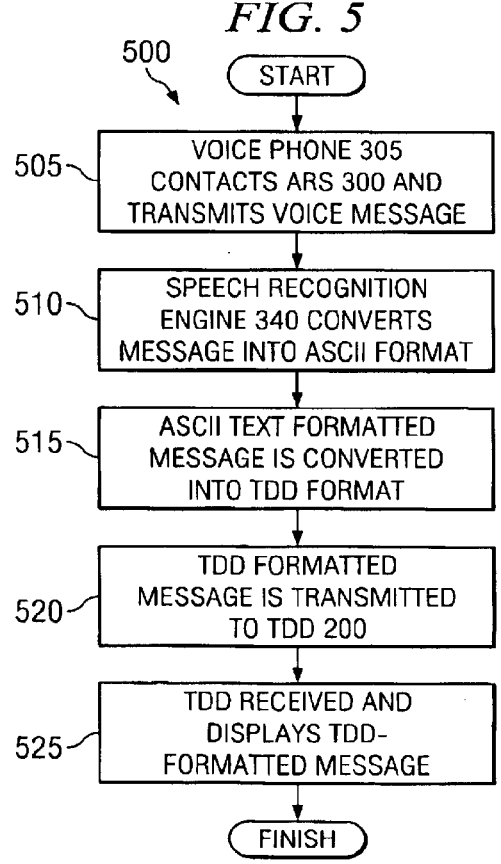
FIG. 5 is a flow diagram illustrating a method of processing a voice communication according to an embodiment of the present invention.

FIG. 5 is a flow chart illustrating a method 500 of processing a voice communication, at an overview level, according to an embodiment of the present invention. Again, at step START of method 500, an ARS such as the ARS 300 described above in reference to FIG. 3 has been provided. Voice phone 305 generates a voice message that is transmitted as an electrical signal to ARS 300 (step 505). There, it is received by speech recognition engine 340, which recognizes certain key words and phrases and converts them into an ASCII text format (step 510). Note that voice phone 305 may have already been in communication with ARS 300 as a result of being called by TDD 200, or may have called ARS directly and provided it with the identity of a TDD with which it wishes to converse. The ASCII text is then converted to a TDD format (step 515) and transmitted to TDD 200 (step 520). TDD 200 then displays the message as received for reading by the user (step 525).

The processes of FIGS. 4 and 5 will now be discussed in greater detail. Note that some variation will occur, explicitly or implicitly, and is considered within the scope of the contemplated invention. Note also that the sequences of steps in the methods described herein are exemplary and for illustration only; in accordance with the present invention the sequence may be varied in any logically-consistent manner.

FIG. 6 is a flow chart illustrating in greater detail a method 600 of TDD/voice communication in accordance with an embodiment of the present invention. Note that herein, TDD/non-TDD communication refers to a call made in a telephone network from or to a TDD user and also involving a telephone service subscriber that is not using a TDD. It also includes calls made using the system and method of the present invention to numbers where TDD availability is uncertain. In the latter case the ARS is invoked to cover the contingency that no such device is available, without the need to first place the call unsuccessfully and then place it again through the ARS.

At START, it is presumed that an ARS such as the one described above has been provided and made ready for use. The system then simply awaits contact by a TDD user. The TDD user makes contact using a telephone number dedicated for the purpose. When a TDD call is received (step 605), the user is prompted for a target recipient phone number (step 610). At this time, the system also preferably confirms that the caller is transmitting TDD code in an acceptable format (step not shown). This ensures that the call is not completed when no communication can effectively take place. Or, if the caller is for some reason transmitting in ASCII code, the ARS may simply accept the transmissions and use them directly as explained below. This confirmation may be achieved by a simple, predetermined message exchange that may in fact include a request for the target phone number. If the received transmission is not in an acceptable format, then the caller is, if possible, notified of this circumstance. For example, if the caller is a voice caller and has reached the ARS by mistake, a prerecorded message can be returned to them informing them of their error. The prerecorded message may be used as well if the call is received in an unknown format, on the presumption that a TDD encoded message would not be understood. In the case of an ARS that accepts voice calls directed to TDD users, but accessible by a different number, the caller may either be so informed or simply transferred to the correct number (or both).

Returning to the embodiment of FIG. 6 it can generally be presumed that most calls to the ARS will be correctly dialed by the proper TDD instrument. In this case, the ARS will next receive a target number and store it in a temporary memory location (step 615). If desired it may also be stored in a permanent log for tracking or billing purposes or for later recall and use. If for whatever reason no number has been received after a certain predetermined time, the connection is dropped (step not shown). In an alternate embodiment (also not shown), if the proper signaling service is available, the TDD call to the ARS may be initiated by entering a code (for example "*76") followed by the number of the target recipient. In this embodiment, of course, the step of prompting the user for a target telephone number is unnecessary. The system may still check for proper format, of course, before setting up the call to the recipient.

Once the phone number of the target recipient has been received and stored, the network path to the recipient is determined and the call is set up (step 620). This may of course involve routing through any level of the network hierarchy or even contacting another network through an appropriate network gateway. If the desired number is not available, then a notification message is sent to the caller (step 625). Note that the connection to the caller does not necessarily have to be dropped at this point. The caller may instead be given the opportunity to provide another number or to be transferred to a directory assistance service. This option is particularly useful where an emergency exists (and has perhaps somehow been indicated, such as through the entry of a prearranged emergency code). Simply dropping the call would only waste time if the caller is required to immediately reconnect and try another call, which in these circumstances might be expected to be the case. Especially valuable would be an automatic connection to an emergency service located in the area from where the call originated. If, on the other hand, the number that the TDD caller is trying to reach is simply busy, and no other number is desired, then the caller may be allowed to request that the number be retried at certain intervals for a limited period of time.

In a preferred embodiment, the ARS 300 may for subscribers store any telephone numbers that they enter, presumably those they expect to call on a regular basis or in an emergency. These numbers may have been previously entered by the user upon beginning or updating a subscription, or may be stored by the network operator for use by the TDD using public at large. In this embodiment, when a TDD user calls they are presented with the option of selecting one of the stored numbers or entering a complete number on their own. In any embodiment, when a user chooses to enter a complete number they may be asked to confirm it is correct before the call is actually set up (step 630).

When a connection to the target recipient has been made, the caller is prompted to an actual message for transmission (step 635). Alternately, the caller may be prompted for an initial message before the recipient is contacted so that it can be stored and, if desired, processed and confirmed by the caller while the call is being set up. In this way it can be presented to the called party as soon as a connection is established. Preferably, however, the called party is initially presented with a prerecorded audio greeting indicating the type of call that is being established (step 640). In this way, the caller is made aware that the call is not simply an advertisement sent indiscriminately from a mass marketing device, but rather an ARS processed call intended for the recipient. The greeting may also contain general instructions on how to proceed, as may be appropriate under the circumstances. Preferably, the instructions may be truncated at the request of the called party as indicated by depressing a certain key or key sequence. This may be desired when the caller is a regular recipient of ARS calls and needs no further instruction. In addition, if the called party is (contrary to expectations) able and willing to communicate with directly the caller through an available TDD, this fact may be signaled up front. A bypass circuit is preferably provided for use in this instance, so that the TDD communication may simply be allowed to continue without tying up the other resources of the ARS, while at the same time not forcing the caller to terminate the call and reconnect directly.

When a message is received from the caller in TDD format (step 645) it is provided to a converter for translation from Baudot format (or whatever other format is used and recognized) to an ASCII text file (step 650). (As mentioned previously, text received for some reason already in ASCII format may simply be used as it is received.) Note that while ASCII format is described in this embodiment there may be other acceptable formats as well. Again, if the initial message has been received from the caller prior to establishing a connection with the called party, it may also be translated into an ASCII file at this time as well. Note that whatever precise sequence is used, it is generally preferable to temporarily store the received message in both Baudot and ASCII format so that it may be reprocessed if necessary (step not shown). When the ACSII file has been prepared, it is provided to the TTS engine for conversion to an audible speech format for presentation to the called party (step 655). At this point the caller may be notified that the message has been sent (step 660). If desired, a second message may then be transmitted, whereupon it is processed and transmitted to the called party as described above. If a delay ensues as subsequent messages are entered and processed, a prerecorded message may provide status information to the called party and request that they wait for further communication. At an appropriate time, it also informs them that they will now be asked to provide their response. (step 670). Note that the response may take any number of predetermined forms. In a preferred embodiment, the user is prompted by IVR facility 320 to enter a DTMF response according to a standard pattern, for example "press 1 for yes, 2 for no, or 3 to enter a vocal response" (a "help" option might also be provided). When the response is received (step 675) it is processed, that is converted into a form that the TDD user can understand (step 680). Where no response is received an appropriate notification can be formulated. The response is then transmitted to the TDD (step 685). This may be the end of the conversation, and the parties may simply terminate the call. In this preferred embodiment, however, when the response has been transmitted, the ARS 300 proceeds to send a query to both parties (step 690) to ascertain whether there are further communications to be transmitted. Further communications, of course, may be entered by either party and if received, are processed appropriately. Additional messages from the TDD are simply processed according to the method 600 described above, while communications from the voice (that is, non-TDD) party are discussed below.

FIG. 7 is a flow chart illustrating a method 700 of processing a call from a voice (that is, non-TDD) caller for transmission to a TDD user in accordance with an embodiment of the present invention. As will be apparent, method 700 is a modified version of method 600 described above. As such, the initial steps of method 700 are not shown. At step START, it is accordingly presumed that a voice caller has properly contacted ARS 300 by using an appropriate phone number or service code, that the phone umber of a target (TDD) recipient has been requested and received, and that the IVR facility 320 has prompted the caller to provide a message for transmission to the recipient. Naturally, for this purpose IVR facility 320 uses not TDD formatted messages and prompts, but instead employs synthesized voice prompts or prerecorded voice messages stored on data storage device 350, or both used in combination. Method 700 then proceeds from the actual receipt of a voice message for processing and transmission to the TDD (step 710). Preferably, the message is delineated by a system "beep" at the beginning and a user generated DTMF signal at the end. The received message is preferably stored in data storage device 350 (step not shown). The voice transmission is also processed by speech recognition engine and converted into an ASCII format text file (or similar suitable form) (step 715). Here it is noted that speech, especially that provided by an unfamiliar caller, is more difficult to accurately convert to an ASCII format than messages originally received in TDD format. The system may, using prerecorded prompts, request that the caller pause, slow down, or repeat certain potions of the voice message (step not shown). In a preferred embodiment, before receiving the voice message, speech recognition engine 340, through IVR facility 320, prompts the caller to repeat a certain series of words so that the system can train to parse the message more accurately. If this is done, a speech recognition template may be created and stored in data storage device 350, perhaps associated with the caller's telephone number or some other form of identification.

Continuing with the embodiment of FIG. 7 when the caller's message has been parsed into an ASCII file, the text file is provided to TTS engine 335, converted to speech, and recited back to the caller (step 720). The caller is then prompted to confirm that the message is satisfactory or ask that it be re-recorded (step 725). Upon hearing the message read back, the user may discover a misstatement or mistranslation and is therefore preferably offered the opportunity to try recording the message again. The message is retranslated and played back to the user as necessary (step 730). If this occurs numerous times, the system may prompt the caller to try a differently-worded message (step not shown). At some point, however the ARS 300 will receive confirmation that the message is satisfactory (step 735). When this occurs, a connection to the TDD user is established (step 740). A prerecorded TDD-formatted message is used to let the TDD user know what type of call is being placed, provided any necessary instructions, and perhaps give the TDD user an opportunity to decline the call (step 745). The ASCII text file is provided to the TDD resource 325, where it is converted into a TDD format for presentation to the recipient TDD (step 750). The TDD user is then prompted for a response (step 755). When a response is received (step 760), it is processed and the result transmitted to the voice caller (step 765). The parties are then prompted to indicate if further communication is desired or if the call should be terminated (step 770). Note that at this point, either party may respond by entering a communication, which is then processed according to the appropriate method.

Although the processes described above may seem laborious, their automated nature means that they should be executable in a fairly rapid manner. In addition, some subscribers will become sufficiently skilled such that a great deal of instruction and message repetition or correction can be avoided. In other words, conversation-quality communications can be achieved. Moreover, it is expected that improved speech-processing capability will enhance operation of the present invention even further, allowing conversations to become more involved and less restricted in form and content.

Finally, the preferred descriptions are of preferred examples for implementing the invention, and the scope of the invention should not necessarily be limited by this description. The scope of the present invention is defined by the following claims.

What is claimed is:

1. An automatic relay system (ARS) for enabling communication between a telecommunications device for the deaf (TDD) user and a voice telephone user through a public telephone network, the system comprising:

an interactive voice response (IVR) system coupled to the public telephone network for enabling network users to interact with the ARS;

a TDD resource coupled to the IVR for sending and receiving communications in TDD format; and a converter coupled to the TDD resource for converting messages between TDD format and text format; and a speech processor coupled to the converter, wherein the IVR system determines a path in the network to a target message recipient and establishes a network connection for the transmission of translated messages.

2. The system according to claim 1, further comprising a data storage device for storing prerecorded messages.

3. The system according to claim 1, wherein the speech processor comprises a text-to-speech converter for converting text formatted messages into speech, so that a speech message can be transmitted to the voice telephone.

4. The system according to claim 3, wherein the speech message is a translation of a TDD format message received from the TDD.

5. The system according to claim 1, wherein the speech processor comprises a speech recognition engine for receiving voice communications from the voice telephone and converting them to a text format.

6. The system according to claim 5, further comprising a data storage device for storing the voice communications in text format.

7. The system according to claim 6, wherein the IVR system includes a processor for directing that the voice communication in text format be retranslated into a voice message and sent to the voice telephone to confirm it is satisfactory to the user.

8. The system according to claim 1, wherein the IVR system causes an instructional message in the appropriate format to be sent to the target recipient upon establishing contact.

9. A method of enabling TDD communications in a telephone network, the method comprising:

providing an ARS accessible to a TDD;

receiving a TDD request in the ARS to set up a call to a specified voice subscriber;

determining in the ARS a path in the network to the voice subscriber;

automatically establishing a connection with the voice subscriber;

receiving a message in TDD format from the TDD;

translating the received message into a speech format; and transmitting the translated message to the voice subscriber.

10. The method according to claim 9, further comprising sending a pre-recorded voice greeting upon establishing contact with the voice subscriber.

11. The method of claim 9, further comprising:

determining whether the voice subscriber is available; and transmitting a TDD notification to the TDD if the voice subscriber is not available.

12. The method according to claim 11, further comprising prompting the TDD to specify an alternate voice subscriber.

13. The method according to claim 11, further comprising automatically selecting an alternate voice subscriber.

14. The method according to claim 9, wherein translating the message comprises:

converting the TDD message to ASCII format; and providing the ASCII formatted message to a TTS engine for conversion to speech format.

15. The method according to claim 14, further comprising transmitting to the voice subscriber a prerecorded message providing instruction on how to respond to the speech format message.

16. The method according to claim 15, wherein the instruction includes a plurality of options from which the voice subscriber may select by causing a DTMF tone to be generated by a voice telephone.

17. The method according to claim 15, further comprising:

receiving a DTMF tone from the voice subscriber;

formulating a TDD response message corresponding to the responsive DTMF tone;

transmitting the TDD response message to the TDD.

* * * * *